United States Patent
Reddy et al.

(10) Patent No.: US 10,090,952 B2
(45) Date of Patent: *Oct. 2, 2018

(54) MASTER/SLAVE NEGOTIATION ASSOCIATED WITH A SYNCHRONOUS ETHERNET NETWORK

(71) Applicant: Juniper Networks, Inc., Sunnyvale, CA (US)

(72) Inventors: M. Ramana Reddy, Anantapur (IN); Satheesh Kumar S, Kollam (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,994

(22) Filed: Aug. 31, 2017

(65) Prior Publication Data
US 2017/0366286 A1 Dec. 21, 2017

Related U.S. Application Data

(63) Continuation of application No. 14/750,104, filed on Jun. 25, 2015, now Pat. No. 9,755,774.

(51) Int. Cl.
*H04J 3/06* (2006.01)
(52) U.S. Cl.
CPC .................................. *H04J 3/0638* (2013.01)
(58) Field of Classification Search
CPC .................................................... H04J 3/0638
See application file for complete search history.

(56) References Cited

U.S. PATENT DOCUMENTS 9,755,774 B1 9/2017 Reddy et al.
2006/0083266 A1 4/2006 Lim
(Continued)

FOREIGN PATENT DOCUMENTS

EP 2343807 7/2011

OTHER PUBLICATIONS

Cisco. Cisco 7600 Series Router Cisco IOS Software Configuration Guide. Release 15 S [online], Aug. 30, 2010 [retrieved on Jan. 25, 2017]. Retrieved from the Internet: <URL: http://www1.cisco.com/c/en/us/td/docs/routers/7600/ios/15S/configuration/guide/7600_15_0s_book/syncE.pdf> Chapter 68, pp. 68-1 to 68-36.
(Continued)

*Primary Examiner* — Omar J Ghowrwal
(74) *Attorney, Agent, or Firm* — Harrity & Harrity, LLP

(57) ABSTRACT

A device may determine a link master/slave relationship for an Ethernet link associated with a connection between a component of the device and a component of another device. The device may determine that Synchronous Ethernet (SyncE) is to be enabled on the Ethernet link. The device may identify the component of the device as a SyncE slave or a SyncE master associated with enabling SyncE on the Ethernet link. The device may provide an indication that the component of the device has been identified as the SyncE slave or the SyncE master. The device may determine a SyncE master/slave relationship associated with enabling SyncE on the Ethernet link. The SyncE master/slave relationship may supersede the link master/slave relationship without altering the link master/slave relationship. The device may cause the component of the device to recover a clock based on the SyncE master/slave relationship rather than the link master/slave relationship.

20 Claims, 8 Drawing Sheets

(56) References Cited

U.S. PATENT DOCUMENTS

2011/0170645 A1 7/2011 Barnette
2011/0305173 A1 12/2011 Wang
2012/0063296 A1 3/2012 Wang
2014/0044133 A1 2/2014 Wang
2016/0156427 A1 6/2016 Yang

OTHER PUBLICATIONS

IEEE, "Part 3: Carrier Sense Multiple Access with Collision Detection (CSMA/CS) access method and Physical Layer specifications", IEEE Standard for Information technology—Telecommunications and information exchange between systems—Local and metropolitan area networks—Specific requirements, IEEE Std 802.3-2008, Jun. 22, 2010, 790 pages.
Wikipedia, "Autonegotiation", http://en.wikipedia.org/wiki/Autonegotiation, Jul. 24, 2014, 6 pages.
Hernandez, "Gigabit Ethernet Auto-Negotiation", http://Www.dell.com/contentItopics/global.aspx/p<mer/er/ps1q01_heman?c=us&I=en&cs=04, 2001, 7 pages.
Ferrant et al., "Synchronous Ethernet: A Method to Transport Synchronization", IEEE Communications Magazine, Sep. 2008, 9 pages.
Wikipedia, "Synchronous Ethernet", http://en.wikipedia.org/wiki/Synchronous_Ethernet, Mar. 30, 2015, 6 pages.

US 10,090,952 B2

MASTER/SLAVE NEGOTIATION ASSOCIATED WITH A SYNCHRONOUS ETHERNET NETWORK

RELATED APPLICATION

This application is a continuation of U.S. patent application Ser. No. 14/750,104, filed Jun. 25, 2015 (now U.S. Pat. No. 9,755,774), which is incorporated herein by reference.

BACKGROUND

Synchronous Ethernet (SyncE) is a standard for computer networking that facilitates the transference of a clock signal over an Ethernet physical layer for purposes of synchronization. The clock signal may be traceable to an external clock, such as a master clock associated with a network.

SUMMARY

According to some possible implementations, a method may comprise: determining, by a first network element, a link master/slave relationship for an Ethernet link, where the Ethernet link may be associated with a connection between a first component of the first network element and a second component of a second network element; receiving, by the first network element, an indication that Synchronous Ethernet (SyncE) is to be enabled on the Ethernet link; selecting, by the first network element and based on the indication, the first component as a SyncE slave associated with enabling SyncE on the Ethernet link; providing, by the first network element, information indicating that the first component has been selected as the SyncE slave; determining, by the first network element and based on providing the information indicating that the first component has been selected as the SyncE slave, a SyncE master/slave relationship associated with enabling SyncE on the Ethernet link, where the SyncE master/slave relationship may supersede the link master/slave relationship for the Ethernet link while maintaining the link master/slave relationship; and causing, by the first network element, the first component to recover a clock based on the SyncE master/slave relationship rather than the link master/slave relationship.

According to some possible implementations, a device may comprise one or more processors to: determine a link master/slave relationship for an Ethernet link, where the Ethernet link may be associated with a connection between a component of the device and a component of another device; determine that Synchronous Ethernet (SyncE) is to be enabled on the Ethernet link; identify, after determining that SyncE is to be enabled on the Ethernet link, the component of the device as a SyncE slave or a SyncE master associated with enabling SyncE on the Ethernet link; provide an indication that the component of the device has been identified as the SyncE slave or the SyncE master; determine, based on providing the indication, a SyncE master/slave relationship associated with enabling SyncE on the Ethernet link, where the SyncE master/slave relationship may supersede the link master/slave relationship without altering the link master/slave relationship; and cause the component of the device to recover a clock based on the SyncE master/slave relationship rather than the link master/slave relationship.

According to some possible implementations, a computer-readable medium may store one or more instructions that, when executed by one or more processors, cause the one or more processors to: determine a link master/slave relationship for an Ethernet link associated with a first component of a first network element and a second component of a second network element; receive an indication that Synchronous Ethernet (SyncE) is to be configured on the Ethernet link; select, based on the indication, the first component a SyncE slave associated with configuring SyncE on the Ethernet link; provide information indicating that the component of the first network element has been selected as the SyncE slave, where the information may be provided using a physical layer; determine, based on providing the information indicating that the first component has been selected as the SyncE slave, a SyncE master/slave relationship associated with configuring SyncE on the Ethernet link, where the SyncE master/slave relationship may be determined independently of the link master/slave relationship for the Ethernet link; and configure the first component to recover a clock based on the SyncE master/slave relationship rather than the link master/slave relationship.

DETAILED DESCRIPTION

Figure 1:
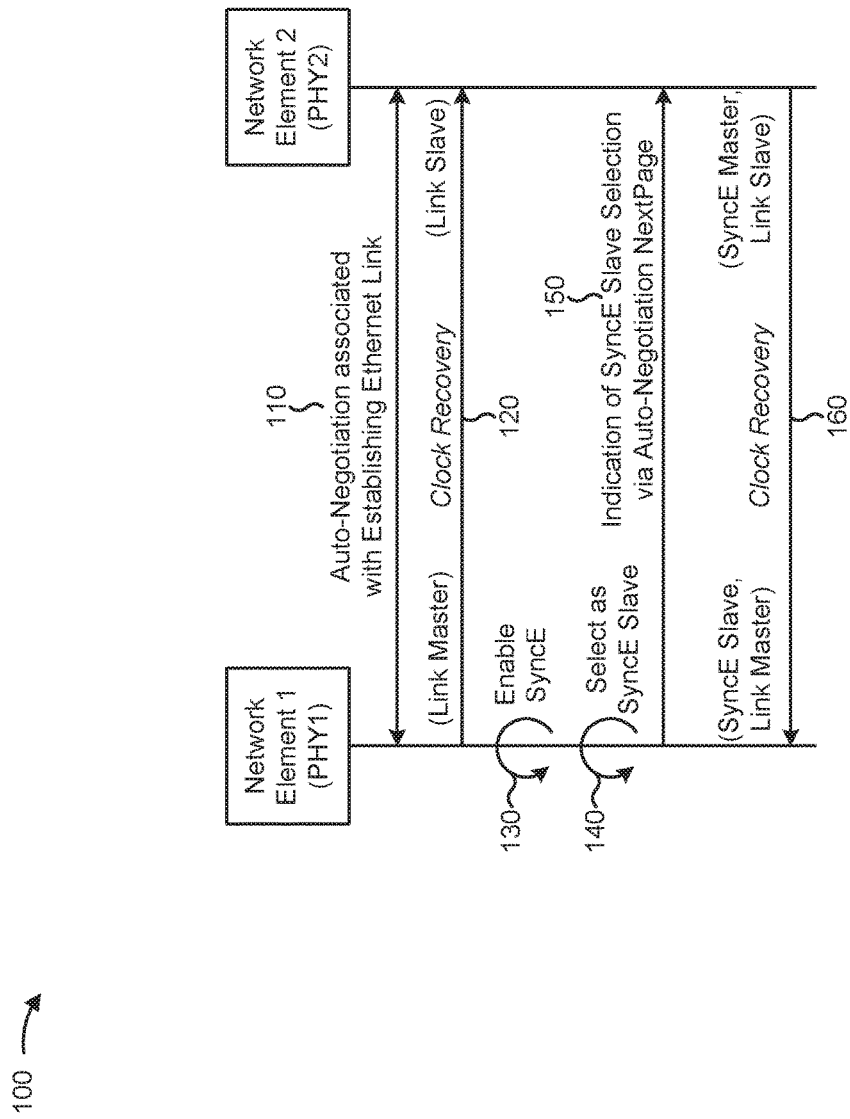
FIG. 1 is a diagram of an overview of an example implementation described herein.

The following detailed description of example implementations refers to the accompanying drawings. The same reference numbers in different drawings may identify the same or similar elements.

An Ethernet link may include an Ethernet connection between a first network element and a second network element, where each end of the link is associated with a component (e.g., an integrated circuit, a chip, a line card, etc.) capable of implementing one or more physical layer functions (herein referred to as a PHY or an Ethernet PHY) associated with the Ethernet link. In a 1000Base-T Ethernet link, one end of the link (e.g., a PHY included in the first network element or a PHY included in the second network element) may be defined as a master PHY, and the other end of the link may be defined as a slave PHY. A master PHY may include a PHY that receives an external clock that the master PHY may use to synchronize and/or time transmissions and/or receptions of information (e.g., Ethernet frames). A slave PHY may include a PHY that is configured to recover the clock from a signal, provided by the master PHY, for use in association with synchronizing and/or timing transmissions and/or receptions associated with the slave PHY. In other words, the slave PHY may rely on the master PHY to provide the clock for synchronization purposes.

In some cases, the master/slave relationship may be established during an auto-negotiation procedure that takes place during establishment of the Ethernet link. The auto-negotiation procedure may allow the two PHYs to communicate regarding selection of transmission parameters associated with the Ethernet link, such as a link speed, a duplex mode, a flow control technique, a master/slave mode, or the like, associated with establishing the Ethernet link. The auto-negotiation procedure may allow the two PHYs to share their capabilities and select the highest performance transmission mode supported by both of the PHYs. In some implementations, the two PHYs may also negotiate the master/slave relationship during the auto-negotiation procedure (e.g., based on master/slave mode information exchanged during the auto-negotiation, based on seed values exchanged during the auto-negotiation, etc.). As such, as a result of the auto-negotiation procedure, the 1000Base-T Ethernet link may be established with a first PHY acting as a master PHY and a second PHY acting as a slave PHY.

However, the master/slave relationship may need to be re-negotiated when enabling SyncE on the Ethernet link. For example, for a 1000Base-T Ethernet link, as described above, a first PHY may be identified as a master PHY and a second PHY may be identified as a slave PHY. However, when enabling SyncE on the Ethernet link the first PHY may need to be identified as a slave and the second PHY may need to be identified as a master PHY when, for example, the second PHY is closer to a primary reference clock within an architecture (e.g., a tree, a ring, a mesh, etc.) associated with enabling SyncE. In other words, the master/slave relationship may need to be re-negotiated and/or reversed between the first PHY and the second PHY when enabling SyncE on the Ethernet link.

One technique that may be used to re-negotiate the master/slave relationship is to configure software, executable by the network element and associated with configuring a PHY that is selected to act as the slave based on enabling SyncE (herein referred to as the selected PHY), to switch from an automatic master/slave mode to a manual slave mode. The auto-negotiation procedure may then be restarted, causing the Ethernet link to be disabled (i.e., come down), and the manual slave mode may force the selected PHY to be identified as the slave PHY during the restarted auto-negotiation, while the other PHY may be identified as the master PHY (e.g., in response to the selected. PHY indicating that the selected PHY is identified as the slave PHY).

However, while the Ethernet link is down during the restarted auto-negotiation, the software may need to be configured to switch the selected PHY back to the automatic mode without affecting the desired outcome of the auto-negotiation. Failure to switch the selected PHY back to the automatic mode may cause the selected PHY to remain in the manual slave mode, which may cause the selected PHY to be ineligible to be a master PHY (e.g., during establishment of an Ethernet link in the future), and/or may prevent an Ethernet link from being established in the future (e.g., when another end of the Ethernet link is similarly configured in the manual slave mode). In some implementations, the software associated with managing this process may be difficult and/or complex to develop and/or implement. Moreover, the software may not be consistent across vendors associated with the network elements, which may lead to problems associated with enabling SyncE in when network elements associated with multiple vendors are involved.

Implementations described herein may provide a SyncE master/slave relationship negotiation that supersedes an existing master/slave relationship associated with an Ethernet link. In some implementations, the SyncE as master/slave relationship may be negotiated via a physical layer without a need for software to manage the SyncE master/slave negotiation. Moreover, the SyncE master/slave negotiation stray not cause the Ethernet link to be disabled, and may allow the existing master/slave relationship to be restored (e.g., at a later time) without a need to restart an auto-negotiation.

FIG. 1 is a diagram of an overview of an example implementation 100 described herein. For the purposes of example implementation 100, assume that a first network element includes a first PHY and that a second network element includes a second PHY. Further, assume that the first network element determines (e.g., based on detecting a wired connection between the first PHY and the second PHY) that an Ethernet link is to be established between the first PHY and the second PHY.

As shown in FIG. 1, and by reference number 110, the first network element and the second network element may participate in an auto-negotiation procedure associated with establishing the Ethernet link. As shown by reference number 120, as part of the auto-negotiation procedure associated with establishing the Ethernet link, the first network element may determine a master/slave relationship associated for the Ethernet link (herein sometimes referred to as a link master/slave relationship). As shown, assume that the link master/slave relationship indicates that the first PHY is to act as the master PHY associated with the Ethernet link (e.g., the link master), and that the second PHY is to act as the slave PHY associated with the Ethernet link (e.g., the link slave). Therefore, as shown, when the Ethernet link is established based on the auto-negotiation procedure, the second PHY may recover a clock from a signal provided by the first PHY.

As further shown by FIG. 1, and by reference number 130, assume that the first network element receives (e.g., at a later time, during establishment of the Ethernet link, etc.) an indication that SyncE is to be enabled on the Ethernet link. As shown by reference number 140, the first network element may determine (e.g., based on executing a clock selection algorithm associated with enabling SyncE, based on user input, etc.) that the first PHY is to act as a SyncE slave when SyncE is enabled on the Ethernet link. As shown by reference number 150, the first network element 220 may provide, to the second network element via an auto-negotiation next page (e.g., a transmission of information during the auto-negotiation procedure, such as a burst of fast link pulses in a particular format), an indication that the first PHY has been selected as the SyncE slave. In some implementations, the first network element may provide the indication during the auto-negotiation procedure (e.g., as a last next page during the auto-negotiation procedure). Additionally, or alternatively, the first network element may provide the indication at a later time (e.g., the first network element may provide the next page after the auto-negotiation is complete and/or the Ethernet link is established).

As shown by reference number 160, the first network element 220 may establish a SyncE master/slave relationship associated with enabling SyncE when, for example, the first network element receives an acknowledgment from the second network element that indicates that the second PHY has been identified as the SyncE master (e.g., in response to the first PHY being selected as the SyncE slay).

Therefore, as shown, the first PHY may be defined as the link master and the SyncE slave, and the second PHY may be defined as the link slave and the SyncE master. In other words, the link master/slave relationship and the SyncE master/slave relationship may be independently identified. As further shown, SyncE may then be enabled on the Ethernet link and, based on the SyncE master/slave relationship (e.g., rather than based on the link master/slave relationship), the first PHY may recover a clock based on a signal provided by the second PHY.

As such, the SyncE master/slave relationship may not overwrite, modify, alter, or the like, the existing link master/slave relationship. Moreover, since the SyncE master/slave relationship may be negotiated via an auto-negotiation next page (i.e., via the physical layer), the first network element and the second network element may not need to store or have access to software associated with managing, modifying, altering, or the like, configurations of the first network element or the second network element in order to establish the SyncE master/slave relationship. Moreover, since the SyncE master/slave relationship does not overwrite, alter, or modify, the link master/slave relationship, the link master/slave relationship may be restored (e.g., at a later time) without restarting the auto-negotiation procedure and without bringing down the Ethernet link.

In this way, a SyncE master/slave relationship negotiation may supersede an existing master/slave relationship associated with an Ethernet link. In some implementations, the SyncE master/slave relationship may be negotiated via a physical layer without a need for software to manage the SyncE master/slave negotiation. Moreover, the SyncE master/slave negotiation may not cause the Ethernet link to be disabled, and may allow the existing master/slave relationship to be restored (e.g., at a later time) without a need for re-negotiation.

Notably, while systems and/or methods are described herein in the context of 1000Base-T Ethernet links, in some implementations, one or more other systems and/or methods may apply to another type of communication standard, such as 1000Base-T2 Ethernet, or another type of communication standard that is capable of using an auto-negotiation technique to establish a master/slave relationship associated with an Ethernet link.

Figure 2:
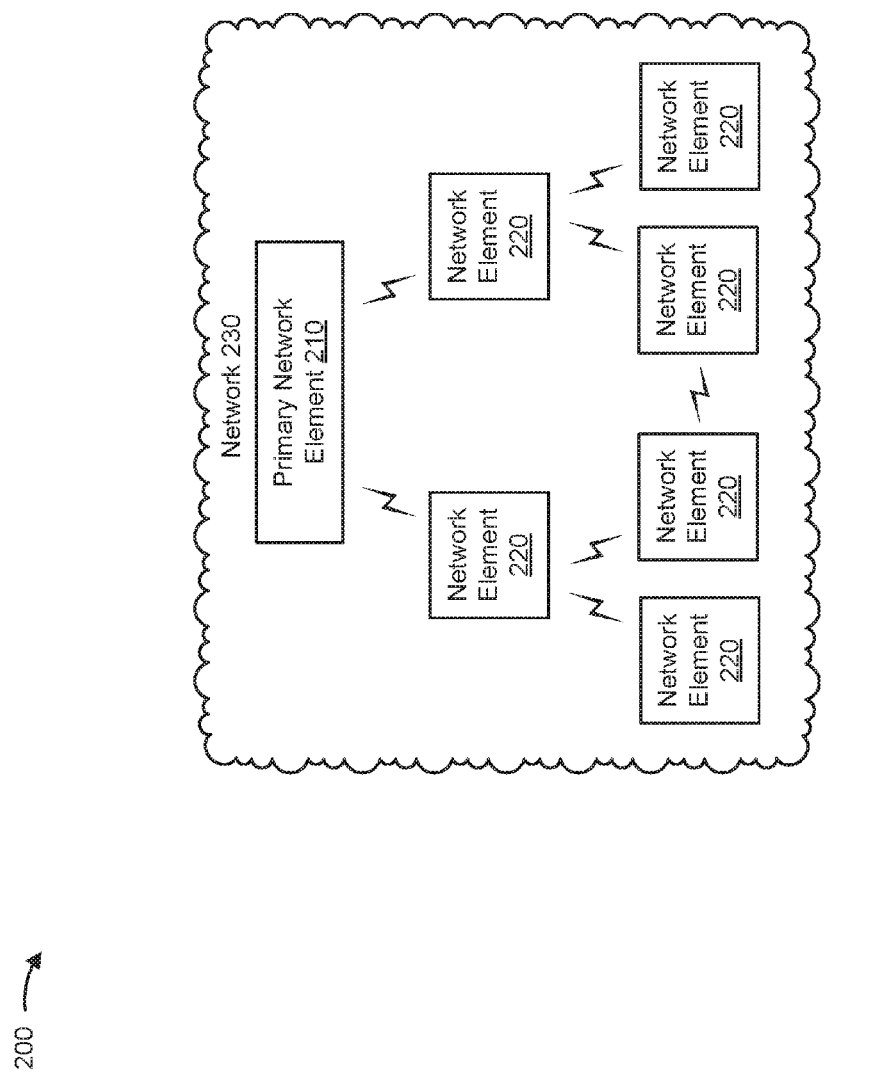
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a primary network element 210, a group of network elements 220, and a network 230. Devices of environment 200 may interconnect via wired connections, wireless connections, or a combination of wired and wireless connections.

Primary network element 210 may include a device capable of providing a master reference clock associated with a SyncE network. Additionally, primary network element 210 may include a device capable of receiving, transmitting, processing, and/or routing data via an Ethernet link. For example, primary network element 210 may include a switch, a router, a server, a gateway, a modem, a firewall, a NIC, a hub, a bridge, an optical add-drop multiplexer (OADM), or another type of data transfer device, included in network 230, that may have access to a master reference clock associated with enabling SyncE. In some implementations, primary network element 210 may provide a signal, associated with the master reference clock accessible by primary network element 210, such that SyncE may be enabled within network 230. In some implementations, primary network element 210 may act as a primary clock source for enabling SyncE associated with one or more Ethernet links.

In some implementations, primary network element 210 may include one or more components (e.g., integrated circuits, chips, line cards, etc.) configured to implement one or more physical layer functions (herein referred to as PHYs or Ethernet PHYs), where each PHY may be capable of acting as a slave PHY or a master PHY in association with an Ethernet link.

Network element 220 may include a device capable of receiving, transmitting, processing, and/or routing data via an Ethernet link associated with a SyncE architecture. For example, network element 220 may include a switch, a router, a server, a gateway, a modem, a firewall, a NIC, a hub, a bridge, an OADM, or another type of data transfer device included in network 230.

In some implementations, network element 220 may be capable of recovering a clock based on a signal, provided by primary network element 210 and/or another network element 220 (e.g., an upstream network element 220), corresponding to a master reference clock. Additionally, or alternatively, network element 220 may be capable of providing a signal with which another network element 220 (e.g., a downstream network element 220) may recover the master reference clock. In some implementations, network element 220 may include one or more PHYs, where each PHY may be capable of acting as a slave PHY or a master PHY in association with an Ethernet link. n some implementations, network element 220 may be included in a SyncE architecture based on a position of network element 220 relative to primary network element 210, such as in a tree, a ring, a mesh, or the like.

Network 230 may include one or more wired and/or wireless networks that allow primary network element 210 and/or network elements 220 to communicate, For example, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
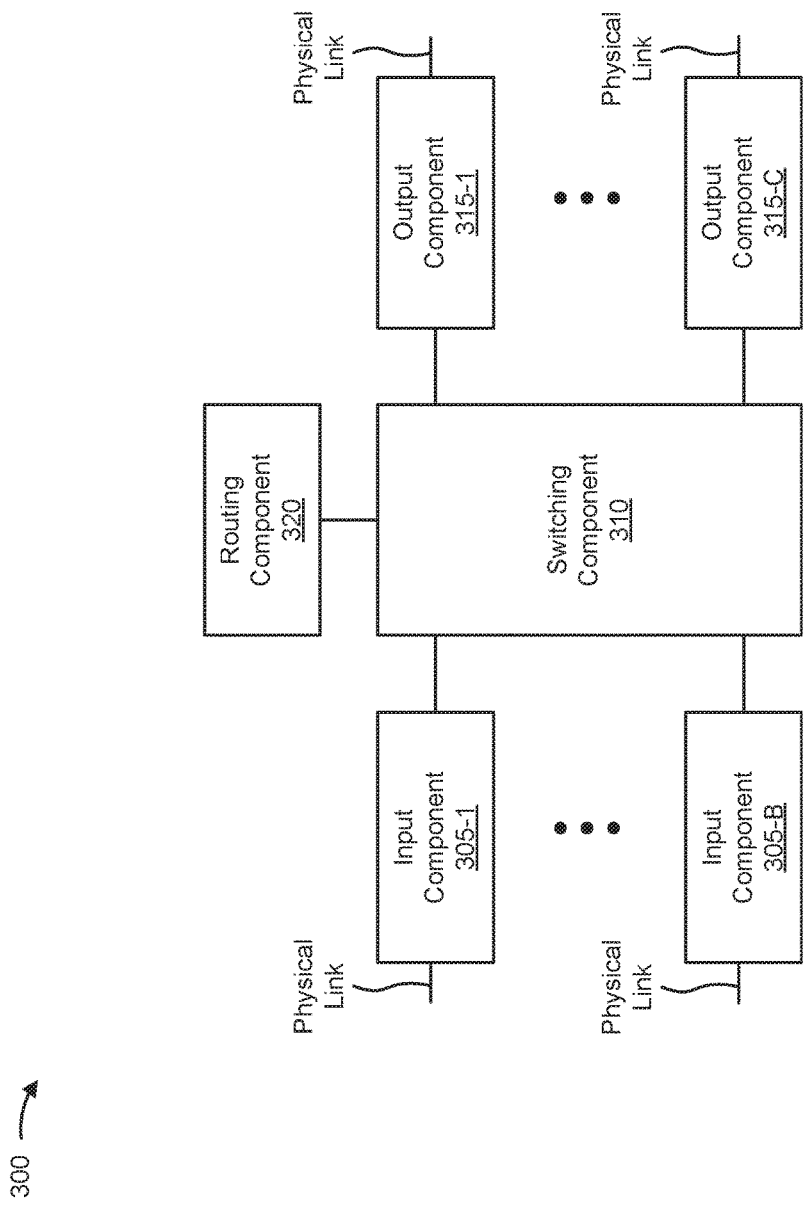
FIG. 3 is a diagram of example components of one or more devices of FIG. 2.

FIG. 3 is a diagram of example components of a device 300. Device 300 may correspond to primary network element 210 and/or network element 220. In some implementations, primary network element 210 and/or network element 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a routing component 320.

Input component 305 may include points of attachment for physical links and may be points of entry for incoming traffic, such as packets and/or Ethernet frames. Input component 305 may process incoming traffic, such as by performing data link layer encapsulation or decapsulation. In some implementations, input component 305 may send traffic to output component 315 via switching component 310.

In some implementations, input component 305 may include an input line card corresponding to a set of input ports associated with device 300. Additionally, or alternatively, input component 305 may include one or more PHYs, where each PHY may be associated with a port of input component 305.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for outgoing traffic, such as packets and/or Ethernet frames. Output component 315 may store traffic and may schedule traffic for transmission on output physical links. Output component 315 may support data link layer encapsulation or decapsulation, and/or a variety of higher-level protocols. In some implementations, output component 315 may send traffic and/or receive traffic.

In some implementations, output component 315 may include an output line card corresponding to a set of output ports associated with device 300. Additionally, or alternatively, output component 315 may include one or more PHYs, where each PHY may be associated with a port of output component 315

Routing component 320 may include one or more processors, microprocessors, field-programmable gate arrays (FPGAs), application-specific integrated circuit (ASICs), or similar types of processing components. In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
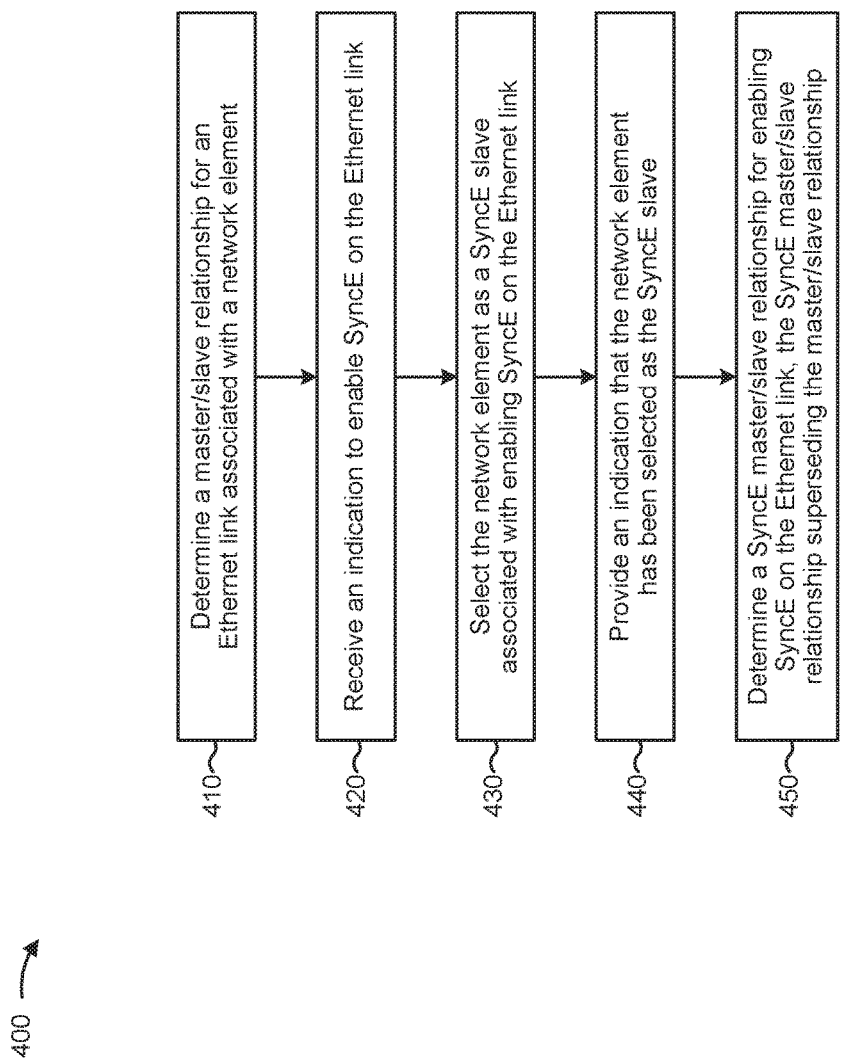
FIG. 4 is a flow chart of an example process for establishing a SyncE master/slave relationship, associated with enabling SyncE on an Ethernet link, that supersedes an existing master/slave relationship associated with the Ethernet link.

FIG. 4 is a flow chart of an example process 400 for establishing a SyncE master/slave relationship, associated with enabling SyncE on an Ethernet link, that supersedes an existing master/slave relationship associated with the Ethernet link. In some implementations, one or more process blocks of FIG. 4 may be performed by network element 220. In some implementations, one or more process blocks of FIG. 4 may be performed by another device or a group of devices separate from or including network element 220, such as primary network element 210.

As shown in FIG. 4, process 400 may include determining a master/slave relationship for an Ethernet associated with a network element (block 410). For example, network element 220 may determine a master/slave relationship for a 1000Base-T Ethernet link associated with network element 220, such as an Ethernet link that includes a first PHY, included in network element 220, and a second PHY included in another network element 220. In some implementations, network element 220 may determine the master/slave relationship when network element 220 establishes the 1000Base-T Ethernet link that includes the first PHY and the second PHY.

In some implementations, network element 220 may determine the master/slave relationship based on an auto-negotiation procedure associated with establishing the 1000Base-T Ethernet link. For example, network element 220 may (e.g., automatically) detect a connection to the other network element (e.g., when the first PHY is connected to the second. PHY via a wired connection). Here, network element 220 may detect the connection based on a signal provided by the other network element 220, such as a connection present pulse provided by the other network element 220.

In some implementations, as described above, the auto-negotiation procedure may allow the first PHY and the second PHY to communicate regarding selection of transmission parameters associated with the 1000Base-T Ethernet link, such as a link speed, a duplex mode, a flow control technique, a master/slave mode, or the like, by sharing their respective capabilities and selecting the highest performance transmission mode supported by both the first and the second PHY.

In some implementations, the first PHY and the second PHY may provide signals during the auto-negotiation procedure in the form of fast link pulse (FLP) bursts to communicate their respective capabilities. In some implementations, each FLY burst may include a data word of 16 bits, which may be referred to as a link code word (LCW). The bits of the link code word may be numbered from 0 to 15, where bit 0 corresponds to a first pulse of the FLP and bit 15 corresponds to a last pulse of the FLP burst.

Figure 5:
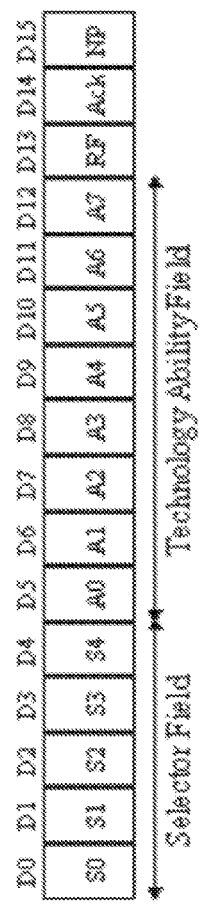
FIG. 5 is a diagram showing example bit positions associated with a base link code word that may be used to communicate capabilities associated with establishing an Ethernet link.

In some implementations, based on detecting the presence of each other, the first PHY and the second PHY may exchange base LCWs in order to begin declaring their respective capabilities associated with establishing the Ethernet link. FIG. 5 is a diagram showing example bit positions associated with a base LCW that may be used to communicate PHY capabilities associated with establishing the Ethernet link. As shown in FIG. 5, the base LCW may include a set of bits associated with a selector field (e.g., D0 through D4), a set of bits associated with a technology ability field (e.g., D5 through D12), and/or one or more bits associated with one or more other fields (e.g., D13 through D15), such as a remote fault field, an acknowledgment field, a next page field, or the like. In some implementations, after exchanging base LCWs, the first PHY and the second PHY may transmit additional information via one or more additional FLP bursts. For example, the first PHY and the second PHY may transmit additional FLP bursts that include additional data words using a next page protocol (e.g., when both the first PHY and the second PHY set the next page bit (bit D15 in FIG. 5) in the base LCW).

In some implementations, the next page protocol may allow the additional information to be transmitted via a message page (MP) and one or more unformatted pages, The MP and the one or more unformatted pages may be LCW encoded in the additional FLP bursts in a similar manner to that of the base LCW.

Figure 6:
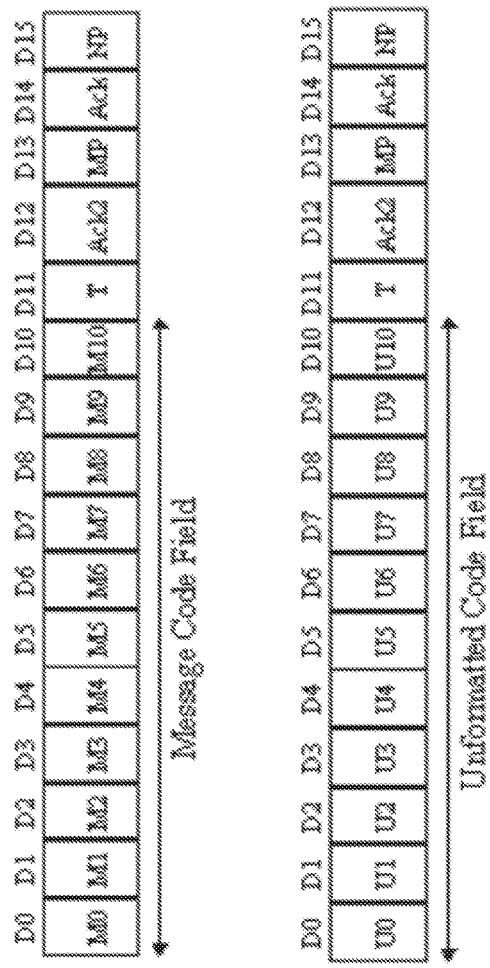
FIG. 6 is a diagram showing example bit positions associated with a message page link code word and an unformatted page link code word associated with establishing an Ethernet link.

FIG. 6 is a diagram showing example bit positions associated with a message page LCW and an unformatted page LCW associated with establishing the Ethernet link. As shown in the upper portion of FIG. 6, the MIP LCW may include a set of bits associated with a message code field (e.g., D0 through D10), and/or one or more bits associated with one or more other fields (e.g., D11 through D15), such as a toggle field, a pair of acknowledgment fields, a message page field, a next page field, or the like.

Similarly, as shown in the lower portion of FIG. 6, the unformatted page LCW may include a set of bits associated with an unformatted code field (e.g., D0 through D10), and/or one or more bits associated with one or more other fields (e.g., D11 through D15), such as a toggle field, a pair of acknowledgment fields, a message page field, a next page field, or the like, In some implementations, the next page protocol may be used to establish a Sync master/slave relationship associated with enabling SyncE on the Ethernet link, as described below.

Returning to FIG. 4, in some implementations, based on a result of auto-negotiation, the 1000Base-T Ethernet link may be established (i.e., the link may remain active, the link may be up, etc.) such that the first PHY is to act as a master PHY for the 1000Base-T Ethernet link (herein referred to as a link master) and the second PHY is to act as a slave PHY for the 1000Base-T Ethernet link (herein referred to as a link slave) for the purposes of clock recovery associated with the 1000Base-T Ethernet fink. Alternatively, as a result of auto-negotiation, the 1000Base-T Ethernet link may be established such that the first PHY is to act as the link slave and the second PHY is to act as the link master for the purposes of clock recovery associated with the 1000Base-T Ethernet link. In this way, network element 220 may determine the master/slave relationship for the 1000Base-T Ethernet link associated with network element 220.

As further shown in FIG. 4, process 400 may include receiving an indication to enable SyncE on the Ethernet link (block 420). For example, network element 220 may receive an indication to enable SyncE on the 1000Base-T Ethernet link. In some implementations, network element 220 may receive the indication after network element 220 determines the master/slave relationship for the 1000Base-T Ethernet link associated with network element 220 (e.g., network element 220 may receive the indication after the 1000Base-T Ethernet link is established). Additionally, or alternatively, network element 220 may receive the indication at another time, such as during establishment of the 1000Base-T Ethernet link (e.g., before establishment of the 1000Base-T Ethernet link is complete).

The indication may indicate that network element 220 is to enable SyncE on one or more Ethernet links associated with network element 220. For example, the indication may indicate that one or more 1000Base-T Ethernet links, corresponding to one or more PHYs of network element 220, are to be configured to implement a SyncE architecture (e.g., a tree, a ring, a mesh, etc. which a master reference clock may be transmitted in order to synchronize and/or time transmissions and/or receptions of data across the one or more 1000Base-T Ethernet links.

In some implementations, network element 220 may receive the indication to enable SyncE on the 1000Base-T Ethernet link based on information provided by another device. For example, network element 220 may receive the indication to enable SyncE when primary network element 210 and/or another network element 220 provides the indication (e.g., when SyncE has been enabled on primary network element 210 and/or the other network element 220). Additionally, or alternatively, network element 220 may receive the indication based on user input. For example, network element 220 may receive the indication based on user input, provided by a user of network element 220 (e.g., a network administrator), indicating that network element 220 is to enable SyncE on the 1000Base-T Ethernet link.

As further shown in FIG. 4, process 400 may include selecting the network element as a SyncE slave associated with the enabling SyncE on the Ethernet link (block 430). For example, network element 220 may select a PHY, included in network element 220, as a PHY that is to act as a slave associated with the enabling SyncE on the 1000Base-T Ethernet link (herein referred to as a SyncE slave). In some implementations, network element 220 may select the PHY as the SyncE slave after network element 220 receives the indication to enable SyncE on the 1000Base-T Ethernet link.

In some implementations, network element 220 may select the PHY as the SyncE slave based on a clock selection algorithm associated with enabling SyncE on the 1000Base-T Ethernet link. For example, in response to receiving the indication to enable SyncE, network element 220 may execute a clock selection algorithm (e.g., stored or accessible by network element 220) that, when executed, may determine that the PHY is positioned to receive a master reference clock associated with primary network element 210 (e.g., when network element 220 is downstream in relation to a different network element 220 that is positioned to receive the master reference clock). In this example, network element 220 may select the PHY as the SyncE slave based on determining that the PHY is positioned to receive a master reference clock from the different network element 220.

Additionally, or alternatively, network element 220 may determine that other PHYs, associated with the network element 220, are to act as SyncE masters. For example, network element 220 may determine that the PHY is to act as the SyncE slave, and may determine that other PHYs, included in network element 220, are to act as SyncE masters (e.g., when network element 220 is positioned upstream of other network elements 220). The other network elements 220 may then similarly determine that the other PHYs are to act as SyncE slaves when enabling SyncE. Additionally, or alternatively, network element 220 may determine that the PHY is to act as the SyncE slave based on user input. For example, a user of network element 220 may provide user input indicating that the PHY is to act as the SyncE slave.

As further shown in FIG. 4, process 400 may include providing an indication that the network element has been selected as the SyncE slave (block 440). For example, network element 220 may provide an indication that the PHY, included in network element 220, has been selected as the SyncE slave. In some implementations, network element 220 may provide the indication that the PHY has been selected as the SyncE slave after network element 220 selects the PHY as the SyncE slave. Additionally, or alternatively, network element 220 may provide the indication that the PHY has been selected as the SyncE slave when network element 220 receives information indicating that network element 220 is to provide the indication.

In some implementations, network element 220 may provide the indication in the form of a next page (e.g., a MP LCW, an unformatted page LCW), similar to that may be used during the auto-negotiation procedure, as described above. For example, network element 220 may transmit a FLP burst (e.g., after the base page associated with the auto-negotiation, after the last next page associated with the auto-negotiation) that includes a next page in the form of a MP LCW, where the MP LCW may include the indication that the PHY has been selected as the SyncE slave. in some implementations, network element 220 may transmit the next page at the end of the auto-negotiation procedure associated with establishing the 1000Base-T Ethernet link (e.g., after the base page and other next pages have been transmitted). Additionally, or alternatively, network element 220 may transmit the additional next page at a later time (e.g., when network element 220 receives the indication to enable SyncE on the Ethernet link after the Ethernet link is established).

In some implementations, the indication may be included in a portion of the next page associated with one or more unused and/or reserved values. For example, network element 220 may set bits M0-M10 (e.g., as shown in FIG. 6) of a MP LCW to an unused message code, such as message code 2047, and may provide the MP LCW to the other network element 220 that includes the other PHY associated with the 1000Base-T Ethernet link, Here, the other network element 220 may be configured to recognize the received message code included in the MP LCW, as described below.

As further shown in FIG. 4, process 400 may include determining a SyncE master/slave relationship for enabling SyncE on the Ethernet link, the SyncE master/slave relationship superseding the master/slave relationship (block 450). For example, network element 220 may determine the SyncE master/slave relationship, for enabling SyncE on the Ethernet link, where the SyncE master/slave relationship may supersede the master/slave relationship determined during the auto-negotiation procedure.

The SyncE master/slave relationship may describe the master/slave relationship associated with enabling SyncE on the Ethernet link. In some implementations, network element 220 may determine the SyncE master/slave relationship based on providing the indication that the PHY, associated with network element 220, has been selected as the SyncE slave. For example, assume that network element 220 provides the indication in the next page in the form of the MP LCW that includes message code of 2047, as described above. Here, the other network element 220 may be configured to recognize a received message code of 2047, included in a next page, as a command to recognize the PHY, included in network element 220 that provided the next page, as the SyncE slave. Thus, the other network element 220 may determine that the other PHY, included in the other network element 220, is to act as the SyncE master. In this example, the other network element 220 may provide (e.g., via a subsequent next page) an acknowledgement of the indication and/or information indicating that the other PHY has been selected to act as the SyncE master.

In some implementations, the SyncE master/slave relationship may supersede the master/slave relationship associated with the establishing the 1000Base-T Ethernet link, For example, assume that, during establishment of a 1000Base-T Ethernet link, a first PHY is defined as a link master and a second PHY is defined as a link slave. Further, assume that, during enablement of SyncE on the 1000Base-T Ethernet link, the first PHY is selected as the SyncE master and the second PHY is identified as the SyncE slave. Here, when SyncE is enabled on the 1000Base-T Ethernet link, the second PHY may act as the master PHY and the first PHY may act as the slave PHY for purposes of clock recovery (e.g., rather than the first PHY acting as the master PHY and the second PHY acting as the slave PHY). However, the SyncE master/slave relationship may not overwrite, alter, and/or modify, the existing link master/slave relationship. As such, should. SyncE be disabled on the 1000Base-T Ethernet link (e.g., when the first PHY is deselected for clock recovery, when SyncE is disabled on the 1000Base-T Ethernet link), the existing link master/slave relationship may be restored without restarting the auto-negotiation procedure and/or without bringing down the 1000Base-T Ethernet link. In some implementations, an amount of processor resources and/or memory resources consumed by network element 220 may thus be reduced (e.g., since network element 220 need not re-establish the 1000Base-T Ethernet link).

Moreover, since the SyncE master/slave relationship may be communicated via auto-negotiation next pages (i.e., via the physical layer), network element 220 may not need to store or have access to software associated with managing, modifying, altering, or the like, configurations of network element 220 in order to determine the SyncE master/slave relationship. In some implementations, an amount of processor resources and/or memory resources consumed by network element 220 may thus be reduced (e.g., since network element 220 need store or execute any such software).

In some implementations, as described above, the SyncE master/slave relationship between a first PHY, associated with network element 220, and a second PHY, associated with another network element 220, may be different than the 1000Base-T Ethernet master/slave relationship determined during the auto-negotiation procedure. For example, the first PHY may be identified as a link master for the 1000Base-T Ethernet link and the second PHY may be identified as a link slave for 1000Base-T Ethernet link, whereas the first PHY may be identified as the SyncE slave for purposes of enabling SyncE and the second PHY may be identified as the SyncE master for purposes of enabling SyncE. In some implementations, the SyncE master/slave relationship may not be different than the link master/slave relationship (e.g., the first PHY may act as the link master and the SyncE master).

Additionally, while process 400 may be described in the context of determining the SyncE master/slave relationship based on determining that network element 220 is to act as the SyncE slave and notifying the other network element 220, in some implementations, the SyncE master/slave relationship may be determined in another manner. For example, the SyncE master/slave relationship may be determined based on determining that network element 220 is to act as the SyncE master (e.g., rather than the SyncE slave), and notifying the other network element 220 accordingly.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 7A:
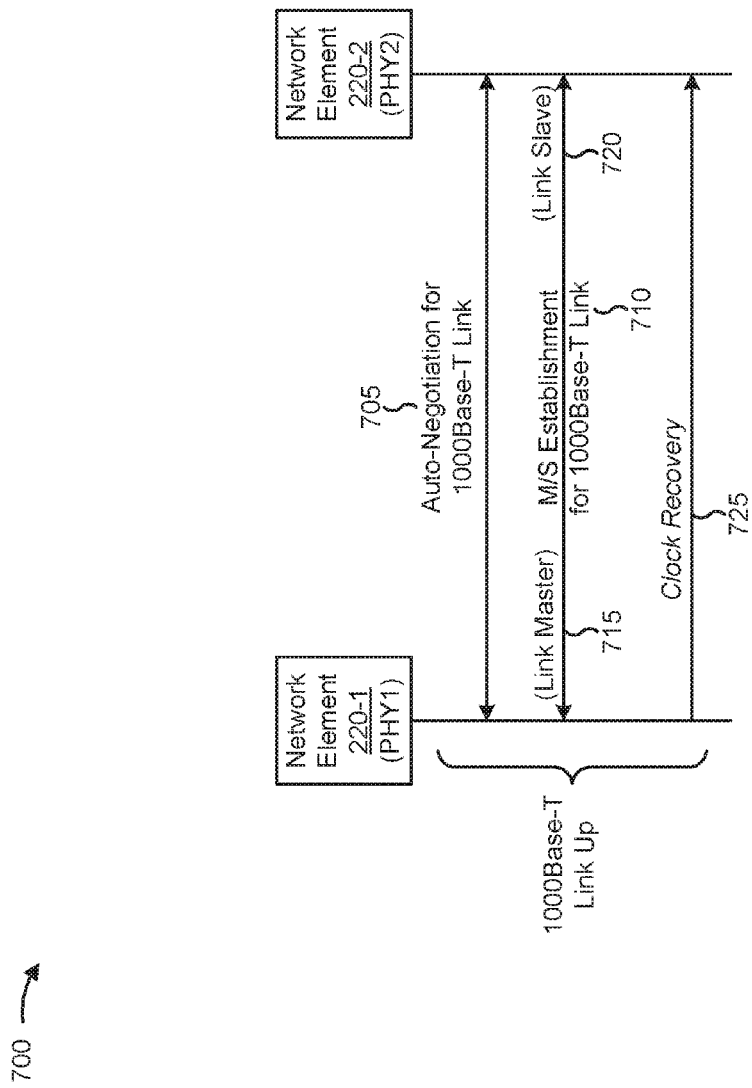
FIGS. 7A and 7B are diagrams of an example implementation relating to the example process shown in FIG. 4.
Figure 7B:
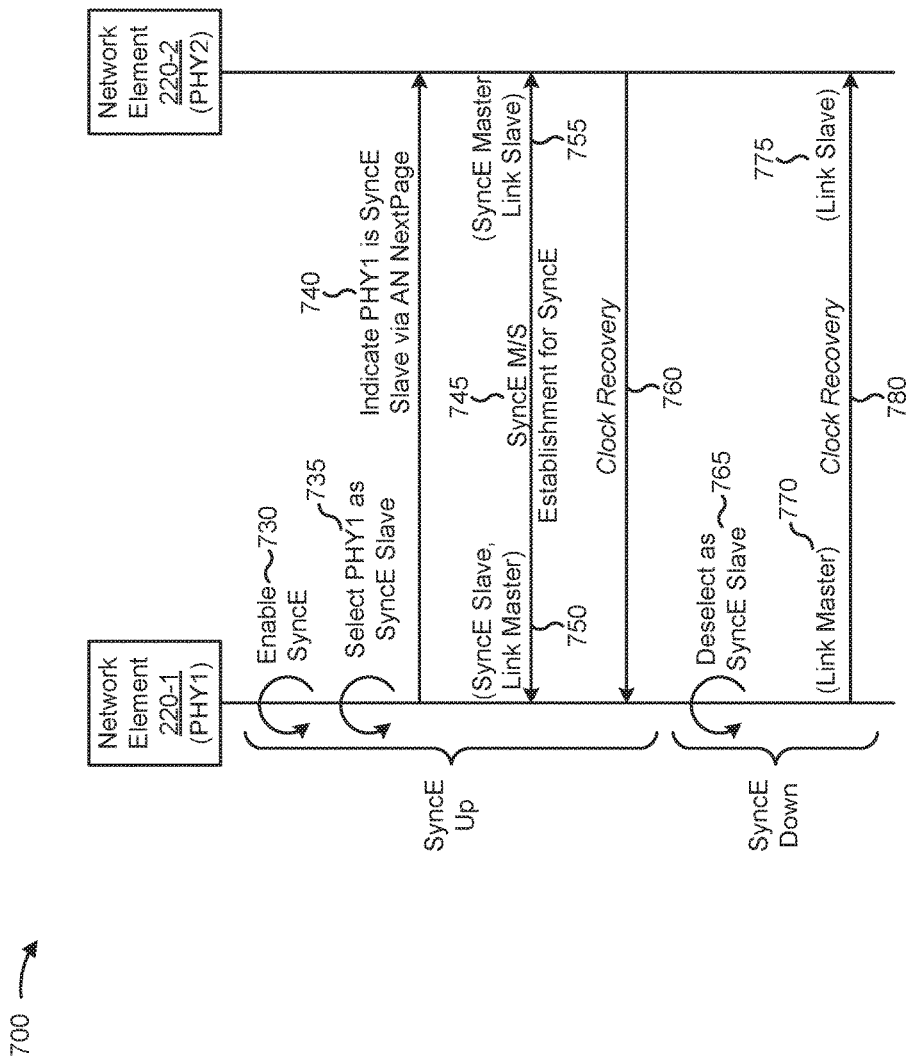

FIGS. 7A and 7B are diagrams of an example implementation 700 relating to example process 400 shown in FIG. 4. For the purposes of example implementation 700, assume that a first network element 220 (e.g., network element 220-1) includes a first PHY (e.g., PHY1) and that a second network element 220 (e.g., network element 220-2) includes a second PHY (e.g., PHY2). Further, assume that the first network element 220 determines based on deter a wired connection between the first PHY and the second PHY) that a 1000Base-T Ethernet link is to be established between the first PHY and the second PHY.

As shown in FIG. 7A, and by reference number 705, based on determining that the 1000Base-T Ethernet link is to be established, the first network element 220 and the second network element 220 may participate in an auto-negotiation procedure associated with establishing the 1000Base-T Ethernet link. As shown by reference number 710, as part of the auto-negotiation procedure, the first network element 220 may determine a master/slave relationship associated for the 1000Base-T Ethernet link. As shown by reference number 715, assume that the first network element 220 determines (e.g., based on information exchanged in base LCWs of the auto-negotiation procedure) that the first PHY is to act as the link master. Similarly, as shown by reference number 720, assume that the first network element 220 determines that the second PHY is to act as the link slave. Therefore, as shown by reference number 725, when the 1000Base-T Ethernet link is established based on the auto-negotiation procedure, the second PHY may be configured to recover a clock from a signal provided by the first PHY.

As shown in FIG. 7B, and by reference number 730, assume that the first network element 220 receives (e.g., at a later time, during establishment of the 1000Base-T Ethernet link, etc.) an indication that SyncE is to be enabled on the 1000Base-T Ethernet link. As shown by reference number 735, the first network element 220 may determine (e.g., based on executing a clock selection algorithm associated with enabling SyncE on the 1000Base-T Ethernet link) that the first PHY is to act as a SyncE slave when SyncE is enabled on the 1000Base-T Ethernet link. As shown by reference number 740, the first network element 220 may provide, to the second network element 220, an indication, that the first PHY has been selected as the SyncE slave, using an auto-negotiation next page (e.g., a MP LCW that includes a message code to be interpreted by the second network element 220). As shown by reference number 745, the first network element 220 may determine the SyncE master/slave relationship associated with enabling SyncE when, for example, the first network element 220 receives an acknowledgment from the second network element 220 that indicates that the second PHY has been identified as the SyncE master e.g., in response to the first PHY be selected as the SyncE slave)

As such, as shown by reference number 750, the first PHY may be identified as the link master and the SyncE slave and, as shown by reference number 755, the second PHY may be identified as the link slave and the SyncE master. As shown by reference number 760, when SyncE is enabled on the 1000Base-T Ethernet link, the first PHY tray recover the clock based on a signal provided by the second PHY based on the SyncE master/slave relationship (e.g., rather than based on the link master/slave relationship).

As shown, the SyncE master/slave relationship may not overwrite the existing link master/slave relationship. Moreover, since the SyncE master/slave relationship may be negotiated via exchange of one or more auto-negotiation next pages (i.e., via the physical layer), the first network element 220 and the second network element 220 need not store or have access to software associated with managing, modifying, altering, or the like, configurations of network elements 220 in order to determine the SyncE master/slave relationship.

As shown by reference number 765, assume that, at a later time, the first network element 220 receives an indication that SyncE is to be disabled on the 1000Base-T Ethernet link. As shown by reference numbers 770 and 775, the link master/slave relationship may be restored such that the first PHY is the link master and the second PHY is the link slave and, as shown by reference number 780, the second PHY may again recover the clock provided by the first PHY. In this way, the existing link master/slave relationship may be restored without restarting the auto-negotiation procedure and/or without bringing down the 1000Base-T Ethernet link.

As indicated above, FIGS. 7A and 7B are provided merely as an example. Other examples are possible and may differ from what was described with regard to FIGS. 7A and 7B.

Implementations described herein may describe a SyncE master/slave relationship negotiation that supersedes an existing master/slave relationship associated with an Ethernet link. In some implementations, the SyncE master/slave relationship may be negotiated via a physical layer without a need for software to manage the SyncE master/slave negotiation. Moreover, the SyncE master/slave negotiation may n cause the Ethernet link to be disabled, and may allow the existing master/slave relationship to be restored (e.g., at a later time) without a need to restart an auto-negotiation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    determining, by a first network element, a link master/slave relationship for an Ethernet link,
        the Ethernet link being associated with a connection between a first component of the first network element and a second component of a second network element;
    receiving, by the first network element, an indication that the second component of the second network element has been selected as a Synchronous Ethernet (SyncE) slave associated with enabling SyncE on the Ethernet link;
    providing, by the first network element and to the second network element, acknowledgment information indicating that the first component has been identified as a SyncE master; and
    determining, by the first network element and based on providing the acknowledgment information, a SyncE master/slave relationship associated with enabling SyncE on the Ethernet link,
        the SyncE master/slave relationship superseding the link master/slave relationship for the Ethernet link.

2. The method of claim 1, where receiving the indication that the second component of the second network element has been selected as the SyncE slave comprises:
    receiving the indication, that the second component has been selected as the SyncE slave, from the second network element using an auto-negotiation next page.

3. The method of claim 1, where the second component of the second network element recovers a clock based on the SyncE master/slave relationship rather than the link master/slave relationship.

4. The method of claim 1, further comprising:
    detecting the connection between the first component of the first network element and the second component of the second network element; and
    determining the link master/slave relationship for the Ethernet link based on detecting the connection between the first component of the first network element and the second component of the second network element.

5. The method of claim 1, where the first network element is positioned upstream from the second network element.

6. The method of claim 1, where determining the link master/slave relationship for the Ethernet link comprises:
    determining the link master/slave relationship based on an auto-negotiation procedure associated with establishing the Ethernet link.

7. The method of claim 1, where the Ethernet link is a 1000Base-T Ethernet link.

8. A first network element, comprising:
    a memory; and
    one or more processors to:
        determine a link master/slave relationship for an Ethernet link,
            the Ethernet link being associated with a connection between a first component of the first network element and a second component of a second network element;
        receive an indication that the second component of the second network element has been selected as a Synchronous Ethernet (SyncE) slave associated with enabling SyncE on the Ethernet link;
        provide, to the second network element, acknowledgment information indicating that the first component has been identified as a SyncE master; and
        determine, based on providing the acknowledgment information, a SyncE master/slave relationship associated with enabling SyncE on the Ethernet link,
            the SyncE master/slave relationship superseding the link master/slave relationship for the Ethernet link.

9. The first network element of claim 8, where, when receiving the indication that the second component of the second network element has been selected as the SyncE slave, the one or more processors are to:
    receive the indication, that the second component has been selected as the SyncE slave, from the second network element using an auto-negotiation next page.

10. The first network element of claim 8, where the second component of the second network element recovers a clock based on the SyncE master/slave relationship rather than the link master/slave relationship.

11. The first network element of claim 8, where the one or more processors are further to:
    detect the connection between the first component of the first network element and the second component of the second network element; and
    determine the link master/slave relationship for the Ethernet link based on detecting the connection between the first component of the first network element and the second component of the second network element.

12. The first network element of claim 8, where the first network element is positioned upstream from the second network element.

13. The first network element of claim 8, where, when determining the link master/slave relationship for the Ethernet link, the one or more processors are to:
    determine the link master/slave relationship based on an auto-negotiation procedure associated with establishing the Ethernet link.

14. The first network element of claim 8, where the Ethernet link is a 1000Base-T Ethernet link.

15. A non-transitory computer-readable medium storing instructions, the instructions comprising:
    one or more instructions that, when executed by one or more processors of a first network element, cause the one or more processors to:
        determine a link master/slave relationship for an Ethernet link,
            the Ethernet link being associated with a connection between a first component of the first network element and a second component of a second network element;
        receive an indication that the second component of the second network element has been selected as a Synchronous Ethernet (SyncE) slave associated with enabling SyncE on the Ethernet link;
        provide, to the second network element, acknowledgment information indicating that the first component has been identified as a SyncE master; and
        determine, based on providing the acknowledgment information, a SyncE master/slave relationship associated with enabling SyncE on the Ethernet link,
            the SyncE master/slave relationship superseding the link master/slave relationship for the Ethernet link.

16. The non-transitory computer-readable medium of claim 15, where the one or more instructions, that cause the one or more processors to receive the indication that the second component of the second network element has been selected as the SyncE slave, cause the one or more processors are to:

receive the indication, that the second component has been selected as the SyncE slave, from the second network element using an auto-negotiation next page.

17. The non-transitory computer-readable medium of claim 15, where the second component of the second network element recovers a clock based on the SyncE master/slave relationship rather than the link master/slave relationship.

18. The non-transitory computer-readable medium of claim 15, where the instructions further comprise:

one or more instructions that, when executed by the one or more processors, cause the one or more processors to:

detect the connection between the first component of the first network element and the second component of the second network element; and determine the link master/slave relationship for the Ethernet link based on detecting the connection between the first component of the first network element and the second component of the second network element.

19. The non-transitory computer-readable medium of claim 15, where the first network element is positioned upstream from the second network element.

20. The non-transitory computer-readable medium of claim 15, where the one or more instructions, that cause the one or more processors to determine the link master/slave relationship for the Ethernet link, cause the one or more processors are to:

determine the link master/slave relationship based on an auto-negotiation procedure associated with establishing the Ethernet link.

* * * * *